US011284262B2

(12) United States Patent
Kim et al.

(10) Patent No.: US 11,284,262 B2
(45) Date of Patent: Mar. 22, 2022

(54) APPARATUS FOR TESTING HACKING OF VEHICLE ELECTRONIC DEVICE

(71) Applicants: LG ELECTRONICS INC., Seoul (KR); KOREA UNIVERSITY RESEARCH AND BUSINESS FOUNDATION, Seoul (KR)

(72) Inventors: Cheolseung Kim, Seoul (KR); Byeongrim Jo, Seoul (KR); Seongsoo Kim, Seoul (KR); Heejo Lee, Seoul (KR); Choongin Lee, Gyeonggi-do (KR); Donghyeok Kim, Gyeongsangbuk-do (KR)

(73) Assignee: LG Electronics Inc. and Korea University Research and Business Foundation, Seoul (KR)

( * ) Notice: Subject to any disclaimer, the term of this patent is extended or adjusted under 35 U.S.C. 154(b) by 280 days.

(21) Appl. No.: 16/480,595

(22) PCT Filed: May 8, 2017

(86) PCT No.: PCT/KR2017/004778
§ 371 (c)(1),
(2) Date: Jul. 24, 2019

(87) PCT Pub. No.: WO2018/139708
PCT Pub. Date: Aug. 2, 2018

(65) Prior Publication Data
US 2019/0394652 A1     Dec. 26, 2019

(30) Foreign Application Priority Data

Jan. 24, 2017 (KR) .......................... 10-2017-0010769

(51) Int. Cl.
*H04L 9/00* (2006.01)
*H04W 12/12* (2021.01)
(Continued)

(52) U.S. Cl.
CPC .......... *H04W 12/12* (2013.01); *G06F 21/577* (2013.01); *H04L 43/50* (2013.01); *H04L 69/22* (2013.01);
(Continued)

(58) Field of Classification Search
CPC ...... H04W 84/12; H04W 12/12; H04L 67/12; H04L 69/22; H04L 43/50; H04L 63/14;
(Continued)

(56) References Cited

U.S. PATENT DOCUMENTS 10,389,744 B2 * 8/2019 Hartkopp ............ H04L 63/1425
10,583,845 B1 * 3/2020 Nicholls .............. G08G 5/0013
(Continued)

FOREIGN PATENT DOCUMENTS

KR   1020080043209    5/2008
KR     101446525    10/2014
(Continued)

OTHER PUBLICATIONS

Abdelnur et al., "KiF: A stateful SIP Fuzzer," 1st International Conference on Principles, Systems and Applications of IP Telecommunications (IPTComm), Columbia University, dated Jul. 2007, 11 pages.
(Continued)

*Primary Examiner* — Josnel Jeudy
(74) *Attorney, Agent, or Firm* — Fish & Richardson P.C.

(57) ABSTRACT

A vehicular electronic device hacking test apparatus includes a transmitter, a receiver, and a processor configured to classify a communication-connection procedure into a plurality of states based on a preset communication protocol, to generate a mutated packet appropriate for the plurality of states, and to transmit a vehicular electronic device through the transmitter, and to determine whether the vehicular electronic device is vulnerable to hacking based on whether
(Continued)

a reception packet corresponding to the mutated packet is received through the receiver.

17 Claims, 11 Drawing Sheets

(51) Int. Cl.
*G06F 21/57* (2013.01)
*H04L 43/50* (2022.01)
*H04L 69/22* (2022.01)
*H04L 67/12* (2022.01)
*H04W 84/12* (2009.01)

(52) U.S. Cl.
CPC ........ *G06F 2221/034* (2013.01); *H04L 67/12* (2013.01); *H04W 84/12* (2013.01)

(58) Field of Classification Search
CPC . H04L 63/10; G06F 2221/034; G06F 21/577; G06F 21/00; G06F 21/50; G06F 21/60; G06F 21/55
USPC .......................................................... 726/25
See application file for complete search history.

(56) References Cited

U.S. PATENT DOCUMENTS

| | | | | |
|---|---|---|---|---|
| 10,743,158 | B2* | 8/2020 | Punithan | H04W 72/085 |
| 10,896,261 | B2* | 1/2021 | Rieger | G05B 19/0425 |
| 2013/0340083 | A1 | 12/2013 | Petrica et al. | |
| 2015/0150124 | A1* | 5/2015 | Zhang | G06F 21/51 |
| | | | | 726/22 |
| 2015/0191135 | A1* | 7/2015 | Ben Noon | H04L 63/1408 |
| | | | | 726/22 |
| 2016/0350211 | A1 | 12/2016 | Cecchetti et al. | |
| 2016/0366156 | A1* | 12/2016 | Kantor | H04L 63/0281 |
| 2018/0227306 | A1* | 8/2018 | Borkowicz | H04L 12/40013 |
| 2018/0234446 | A1* | 8/2018 | Conner | H04W 12/122 |
| 2018/0294991 | A1* | 10/2018 | Tsurumi | B60R 25/00 |
| 2018/0337957 | A1* | 11/2018 | Chen | H04L 63/205 |
| 2018/0375881 | A1* | 12/2018 | Wada | H04L 63/1416 |
| 2019/0268376 | A1* | 8/2019 | Park | H04L 9/006 |
| 2020/0003890 | A1* | 1/2020 | Yong | G01S 13/18 |
| 2020/0097663 | A1* | 3/2020 | Sato | H04L 67/12 |
| 2020/0120117 | A1* | 4/2020 | Hong | H04L 63/0254 |
| 2020/0233060 | A1* | 7/2020 | Lull | G01S 7/497 |
| 2020/0247359 | A1* | 8/2020 | Murray | G05D 1/0214 |
| 2021/0297388 | A1* | 9/2021 | Park | H04L 63/1416 |

FOREIGN PATENT DOCUMENTS

| | | |
|---|---|---|
| KR | 1020150017255 | 2/2015 |
| KR | 101525398 | 6/2015 |
| KR | 1020160096729 | 8/2016 |

OTHER PUBLICATIONS

Banks et al., "SNOOZE: Toward a Stateful NetwOrk protocol fuzZEr," Department of Computer Science, University of California, Santa Barbara, 2006, 16 pages.

Bayer et al., "Don't Fuss about Fuzzing: Fuzzing Controllers in Vehicular Networks," ESCRYPT, Germany, dated Jan. 2015, 10 pages.

Extended European Search Report in European Application No. 17894411.2, dated Aug. 3, 2020, 17 pages.

Jinkeun Hong, "Cyber Security Issues in Connected Vehicle of Intelligent Transport System," Indian Journal of Science and Technology, dated Jun. 2016, 8 pages.

Korean Notice of Allowance in Korean Application No. 10-2017-0010769, dated May 9, 2018, 4 pages (with English translation).

Neves et al., "Using Attack Injection to Discover New Vulnerabilities," IEEE Computer Society, International Conference on Dependable Systems and Networks, 2006, 10 pages.

PCT International Search Report in International Application No. PCT/KR2017/004778, dated May 8, 2017, 7 pages (with English translation).

* cited by examiner

FIG. 6

[Original Packet]
00 00 3a 01 00 21 29 e8 93 1d 3c d0 f8 5f bd e5 00 21 29 e8 93 1d 50 17 21 04 0f 00 00 09 6c 69 6e 6b 73 79 73
2d 6e 01 08 82 84 8b 96 24 30 48 6c 32 04 0c 12 18 60 2d 1a 00 01 19 ff 00 00 00 00 00 00 00 00 00 00 00 00
00 00 00 00 00 00 00 00 00 09 00 10 18 02 01 00 04 00 00 dd 1e 00 90 4c 33 00 01 19 ff 00 00 00 00 00 00 00
00 00 00 00 00 00 00 00 00 00 00 00 00 00 00 00 00 dd 07 00 50 f2 02 00 01 00
                                    862
861

[Mutated Packet]
00 00 3a 01 00 21 29 e8 93 1d 90 9f 33 ed e9 f6 00 21 29 e8 93 1d 50 17 21 04 0f 00 00 09 6c 69 6e 6b 73 79 73 2d
6e d6 04 ff ff ff ff ff ff ff ff ff ff ff ff ff ff ff ff ff ff ff ff ff ff ff ff ff ff ff ff ff ff ff ff ff ff ff
ff ff ff ff ff ff ff ff ff ff ff ff ff ff ff ff ff ff ff ff ff ff ff ff ff ff ff ff ff ff ff ff ff ff ff ff ff ff
ff ff ff ff ff ff ff ff ff ff ff ff ff ff ff ff ff ff ff ff ff 01 08 82 84 8b 96 24 30 48 6c
8f 00 dd 1e 00 90 4c 33 00 01 19 ff 00 00 00 00 00 00 00 00 00 00 00 00 00 00 00 00 00 dd 09 00
10 18 02 01 00 04 00 00 00 dd 07 00 50 f2 02 00 01 00

APPARATUS FOR TESTING HACKING OF VEHICLE ELECTRONIC DEVICE

CROSS-REFERENCE TO RELATED APPLICATIONS

This application is a National Stage application under 35 U.S.C. § 371 of International Application No. PCT/KR2017/004778, filed on May 8, 2017, which claims the benefit of Korean Application No. 10-2017-0010769, filed on Jan. 24, 2017. The disclosures of the prior applications are incorporated by reference in their entirety.

TECHNICAL FIELD

The present invention relates to a vehicular electronic device hacking test apparatus.

BACKGROUND ART

A vehicle refers to a device that carries a passenger in a passenger-intended direction. A car is a major example of the vehicle.

To increase the convenience of vehicle users, a vehicle is equipped with various sensors and electronic devices. Especially, an advanced driver assistance system (ADAS) and an autonomous vehicle are under active study to increase the driving convenience of users.

Various devices are installed in such vehicles. Recently, various media have released cases of hacking a vehicle. As a method of preventing such hacking, a device that is not vulnerable to hacking is manufactured.

DISCLOSURE

Technical Problem

To overcome the above problems, embodiments of the present invention provide a hacking test apparatus for checking whether a vehicular electronic device is vulnerable to hacking.

It is to be understood that both the foregoing general description and the following detailed description of the present invention are exemplary and explanatory and are intended to provide further explanation of the invention as claimed.

Technical Solution

To overcome the problems, the present invention provides a vehicular electronic device hacking test apparatus includes a transmitter, a receiver, and a processor configured to classify a communication-connection procedure into a plurality of states based on a preset communication protocol, to generate a mutated packet appropriate for the plurality of states, and to transmit the mutated packet to a vehicular electronic device through the transmitter, and to determine whether the vehicular electronic device is vulnerable to hacking based on whether a reception packet corresponding to the mutated packet is received through the receiver.

Details of other embodiments are included in detailed descriptions and drawings.

Advantageous Effects

As is apparent from the foregoing description, the embodiments of the present invention have the following one or more effects.

First, whether a vehicular electronic device is vulnerable to hacking may be determined for each of a plurality of states, and thus whether the vehicular electronic device is vulnerable to hacking may be more precisely determined.

Second, hacking of the vehicular electronic device may be prevented through a test with respect to various devices included in a vehicle.

Third, a test may be performed while a plurality of states are randomly changed, and thus whether the vehicular electronic device is vulnerable to hacking may be more accurately identified.

It will be appreciated by persons skilled in the art that that the effects that could be achieved with the present invention are not limited to what has been particularly described hereinabove and other advantages of the present invention will be more clearly understood from the following claims.

BRIEF DESCRIPTION OF THE DRAWINGS

FIG. 6 is a diagram for explanation of a mutated packet implemented in a hexadecimal digit according to an embodiment of the present invention.

DETAILED DESCRIPTION OF THE PREFERRED EMBODIMENTS

Figure 1:
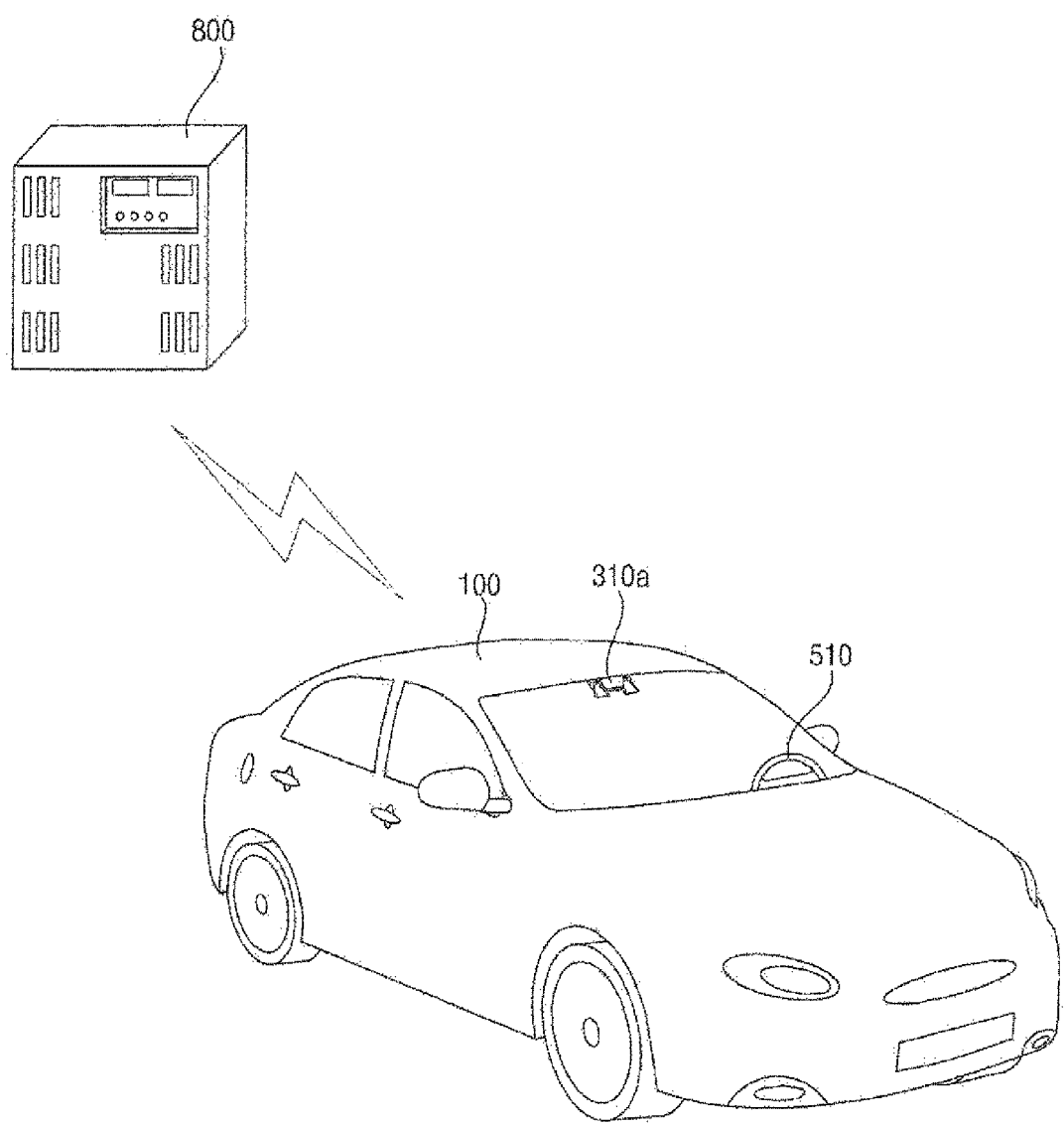
FIG. 1 is a diagram showing a hacking device for a vehicle and a vehicle according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" are intended to include the plural forms as well, unless context clearly indicates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The term "vehicle" employed in this specification may include an automobile and a motorcycle. Hereinafter, description will be given mainly focusing on an automobile.

The vehicle described in this specification may include a vehicle equipped with an internal combustion engine as a power source, a hybrid vehicle equipped with both an engine and an electric motor as a power source, and an electric vehicle equipped with an electric motor as a power source.

In the description below, the left side of the vehicle means the left side with respect to the travel direction of the vehicle and the right side of the vehicle means the right side with respect to the travel direction of the vehicle.

FIG. 1 is a diagram showing a hacking device for a vehicle and a vehicle according to an embodiment of the present invention.

Figure 2:
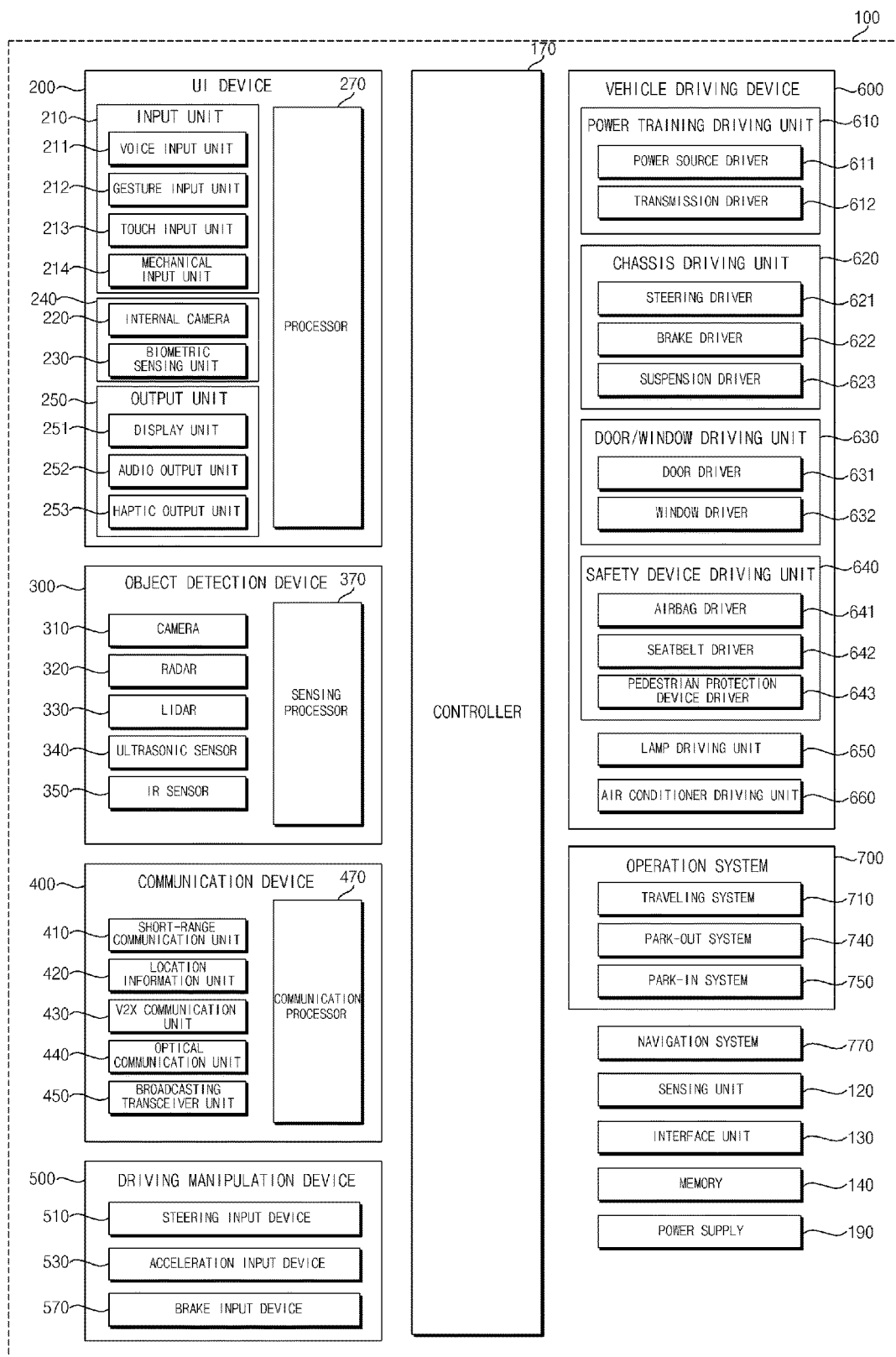
FIG. 2 is a block diagram for explanation of a vehicle according to an embodiment of the present invention.

FIG. 2 is a block diagram for explanation of a vehicle according to an embodiment of the present invention.

Referring to FIGS. 1 to 2, a vehicle 100 may include wheels rotated by a power source, and a steering input device 510 for controlling a travel direction of the vehicle 100.

The vehicle 100 may be an autonomous vehicle.

The vehicle 100 may switch to an autonomous driving mode or a manual mode according to a user input.

For example, the vehicle 100 may switch from the manual mode to the autonomous driving mode or from the autonomous driving mode to the manual mode, based on a user input received through a user interface (UI) device 200.

The vehicle 100 may switch to the autonomous driving mode or the manual mode based on traveling situation information.

The traveling situation information may include at least one of information about objects outside the vehicle, navigation information, or vehicle state information.

For example, the vehicle 100 may switch from the manual mode to the autonomous driving mode or from the autonomous driving mode to the manual mode, based on traveling situation information generated from an object detection device 300.

For example, the vehicle 100 may switch from the manual mode to the autonomous driving mode or from the autonomous driving mode to the manual mode, based on traveling situation information generated from a communication device 400.

The vehicle 100 may switch from the manual mode to the autonomous driving mode or from the autonomous driving mode to the manual mode, based on information, data, or a signal provided from an external device.

If the vehicle 100 travels in the autonomous driving mode, the autonomous vehicle 100 may be operated based on an operation system 700.

For example, the autonomous vehicle 100 may travel based on information, data, or signals generated from a traveling system 710, a park-out system 740, and a park-in system.

If the vehicle 100 drives in the manual mode, the autonomous vehicle 100 may receive a user input for driving through a driving manipulation device 500. The vehicle 100 may travel based on the user input received through the driving manipulation device 500.

The overall length refers to the length of the vehicle 100 from the front to back of the vehicle 100, the width refers to the width of the vehicle 100, and the height refers to the distance from the bottom of wheels to the roof of the vehicle. In the description below, the overall-length direction L may indicate a direction in which measurement of overall length of the vehicle 100 is performed, the width direction W may indicate a direction in which measurement of width of the vehicle 100 is performed, and the height direction H may indicate a direction in which measurement of height of the vehicle 100 is performed.

The vehicle 100 may include the UI device 200, the object detection device 300, the communication device 400, the driving manipulation device 500, a vehicle driving device 600, the operation system 700, a navigation system 770, a sensing unit 120, an interface unit 130, a memory 140, a controller 170, and a power supply 190.

In some embodiments, the vehicle 100 may further include a new component in addition to the components described in the present invention, or may not include a part of the described components.

The UI device 200 is used to enable the vehicle 100 to communicate with a user. The UI device 200 may receive a user input, and provide information generated from the vehicle 100 to the user. The vehicle 100 may implement UIs or User Experience (UX) through the UI device 200.

The UI device 200 may include an input unit 210, an internal camera 220, a biometric sensing unit 230, an output unit 250, and a processor 270.

In some embodiments, the UI device 200 may further include a new component in addition to components described below, or may not include a part of the described components.

The input unit 210 is provided to receive information from a user. Data collected by the input unit 210 may be analyzed by the processor 270 and processed as a control command from the user.

The input unit 210 may be disposed inside the vehicle 100. For example, the input unit 210 may be disposed in an area of a steering wheel, an area of an instrument panel, an area of a seat, an area of a pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert a voice input of the user to an electrical signal. The electrical signal may be provided to the processor 270 or the controller 170.

The voice input unit 211 may include one or more microphones.

The gesture input unit 212 may convert a gesture input of the user to an electrical signal. The electrical signal may be provided to the processor 270 or the controller 170.

The gesture input unit 212 may include at least one of an infrared (IR) sensor or an image sensor, for sensing a gesture input of the user.

In some embodiments, the gesture input unit 212 may sense a three-dimensional (3D) gesture input of the user. For this purpose, the gesture input unit 212 may include a light output unit for emitting a plurality of IR rays or a plurality of image sensors.

The gesture input unit 212 may sense a 3D gesture input of the user by Time of Flight (ToF), structured light, or disparity.

The touch input unit 213 may convert a touch input of the user to an electrical signal. The electrical signal may be provided to the processor 270 or the controller 170.

The touch input unit 213 may include a touch sensor for sensing a touch input of the user.

In some embodiments, a touch screen may be configured by integrating the touch input unit 213 with a display unit 251. The touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on the steering wheel, the center fascia, the center console, the cockpit module, a door, or the like.

The internal camera 220 may acquire a vehicle interior image. The processor 270 may sense a state of a user based on the vehicle interior image. The processor 270 may acquire information about the gaze of a user in the vehicle interior image. The processor 270 may sense the user's gesture in the vehicle interior image.

The biometric sensing unit 230 may acquire biometric information about a user. The biometric sensing unit 230 may include a sensor for acquiring biometric information about a user, and acquire information about a fingerprint, heart beats, and so on of a user, using the sensor. The biometric information may be used for user authentication.

The output unit 250 is provided to generate a visual output, an acoustic output, or a haptic output.

The output unit 250 may include at least one of the display unit 251, an audio output unit 252, or a haptic output unit 253.

The display unit 251 may display graphic objects corresponding to various kinds of information.

The display unit 251 may include at least one of a liquid crystal display (LCD), a thin film transistor-liquid crystal display (TFT LCD), an organic light-emitting diode (OLED) display, a flexible display, a 3D display, or an e-ink display.

The display unit 251 may form a layered structure together with the touch input unit 213 or be integrated with the touch input unit 213, thereby implementing a touchscreen.

The display unit 251 may be implemented as a head up display (HUD). In this case, the display unit 251 may be provided with a projection module, and output information by an image projected onto the windshield or a window.

The display unit 251 may include a transparent display. The transparent display may be attached to the windshield or a window.

The transparent display may display a specific screen with a specific transparency. To have a transparency, the transparent display may include at least one of a transparent Thin Film Electroluminescent (TFFL) display, a transparent OLED display, a transparent LCD, a transmissive transparent display, or a transparent LED display. The transparency of the transparent display is adjustable.

The UI device 200 may include a plurality of display units 251a to 251g.

The display unit 251 may be disposed in an area of the steering wheel, areas 251a, 251b, and 251e of the instrument panel, an area 251d of a seat, an area 251f of a pillar, an area 251g of a door, an area of the center console, an area of a head lining, or an area of a sun visor, or may be implemented in an area 251c of the windshield, and an area 251h of a window.

The audio output unit 252 converts an electrical signal received from the processor 270 or the controller 170 to an audio signal, and outputs the audio signal. To this end, the audio output unit 252 may include one or more speakers.

The haptic output unit 253 generates a haptic output. For example, the haptic output unit 253 may vibrate the steering wheel, a seat belt, a seat 110FL, 110FR, 110RL, or 110RR, so that a user may perceive the output.

The processor 270 may control an operation of each unit of the UI device 200.

In some embodiments, the UI device 200 may include a plurality of processors 270 or no processor 270.

If the UI device 200 does not include any processor 270, the UI device 200 may operate under control of a processor of another device in the vehicle 100, or under control of the controller 170.

The UI device 200 may be referred to as a vehicle display device.

The UI device 200 may operate under control of the controller 170.

The object detection device 300 is used to detect an object outside the vehicle 100. The object detection device 300 may generate object information based on sensing data.

The object information may include information indicating presence or absence of an object, information about the location of an object, information indicating the distance between the vehicle 100 and the object, and information about a relative speed of the vehicle 100 with respect to the object.

The object may be any of various objects related to driving of the vehicle 100.

The object O may include a lane OB10, another vehicle OB11, a pedestrian OB12, a two-wheeled vehicle OB13, a traffic signal OB14 and OB15, light, a road, a structure, a speed bump, a geographical feature, and an animal.

The lane OB10 may include a traveling lane, a lane next to the traveling lane, and a lane in which a vehicle is driving in the opposite direction. The lane OB10 may conceptually include left and right lines that define each of the lanes.

The other vehicle OB11 may be a vehicle traveling in the vicinity of the vehicle 100. The other vehicle OB11 may be located within a predetermined distance from the vehicle 100. For example, the other vehicle OB11 may precede or follow the vehicle 100.

The pedestrian OB12 may be a person located around the vehicle 100. The pedestrian OB12 may be a person located within a predetermined distance from the vehicle 100. For example, the pedestrian OB12 may be a person on a sidewalk or a roadway.

The two-wheel vehicle OB13 may refer to a transportation means moving on two wheels, located around the vehicle 100. The two-wheel vehicle OB13 may be a transportation means having two wheels, located within a predetermined distance from the vehicle 100. For example, the 2-wheel vehicle OB13 may be a motorcycle or bicycle on a sidewalk or a roadway.

The traffic signals may include a traffic signal lamp OB15, a traffic sign OB14, and a symbol or text drawn or written on a road surface.

The light may be light generated from a lamp of another vehicle. The light may be generated from a street lamp. The light may be sunlight.

The road may include a road surface, a curve, and a slope such as an uphill or downhill road.

The structure may be an object fixed on the ground, near to a road. For example, the structure may be any of a street lamp, a street tree, a building, a utility pole, a signal lamp, and a bridge.

The geographical feature may include a mountain, a hill, and so on.

Objects may be classified into mobile objects and stationary objects. For example, the mobile objects may conceptually include another vehicle and a pedestrian. For example, the stationary objects may conceptually include a traffic signal, a road, and a structure.

The object detection device 300 may include a camera 310, a Radio Detection and Ranging (RADAR) 320, a Light Detection and Ranging (LiDAR) 330, an ultrasonic sensor 340, an IR sensor 350, and a processor 370.

In some embodiments, the object detection device 300 may further include a new component in addition to components described below or may not include a part of the described components.

To acquire a vehicle exterior image, the camera 310 may be disposed at an appropriate position on the exterior of the vehicle 100. The camera 310 may be a mono camera, a stereo camera 310a, around view monitoring (AVM) cameras 310b, or a 360-degree camera.

The camera 310 may acquire information about the location of an object, information about a distance to the object, or information about a relative speed with respect to the object by any of various image processing algorithms.

For example, the camera 310 may acquire information about a distance to an object and information about a relative speed with respect to the object in an acquired image, based on a variation in the size of the object over time.

For example, the camera 310 may acquire information about a distance to an object and information about a relative speed with respect to the object through a pin hole model, road surface profiling, or the like.

For example, the camera 310 may acquire information about a distance to an object and information about a relative speed with respect to the object based on disparity information in a stereo image acquired by the stereo camera 310a.

For example, to acquire an image of the front view of the vehicle 100, the camera 310 may be disposed in the vicinity of a front windshield inside the vehicle 100. Alternatively, the camera 310 may be disposed around a front bumper or a radiator grille.

For example, to acquire an image of what lies behind the vehicle 100, the camera 310 may be disposed in the vicinity of a rear glass inside the vehicle 100. Or the camera 310 may be disposed around a rear bumper, a trunk, or a tail gate.

For example, to acquire an image of what lies on a side of the vehicle 100, the camera 310 may be disposed in the vicinity of at least one of side windows inside the vehicle 100. Alternatively, the camera 310 may be disposed around a side view mirror, a fender, or a door.

The camera 310 may provide an acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency Shift Keying (FSK) as a pulse RADAR scheme according to a signal waveform.

The RADAR 320 may detect an object in TOF or phase shifting by electromagnetic waves, and determine the location, distance, and relative speed of the detected object.

The RADAR 320 may be disposed at an appropriate position on the exterior of the vehicle 100 in order to sense an object ahead of, behind, or on a side of the vehicle 100.

The LiDAR 330 may include a laser transmitter and a laser receiver. The LiDAR 330 may be implemented in TOF or phase shifting.

The LiDAR 330 may be implemented in a driven or non-driven manner.

If the LiDAR 330 is implemented in the driven manner, the LiDAR 330 may be rotated by a motor and detect an object around the vehicle 100.

If the LiDAR 330 is implemented in a non-driven manner, the LiDAR 330 may detect an object within a predetermined range from the vehicle 100 by optical steering. The vehicle 100 may include a plurality of non-driven LiDARs 330.

The LiDAR 330 may detect an object in TOF or phase shifting by laser light, and determine the location, distance, and relative speed of the detected object.

The LiDAR 330 may be disposed at an appropriate position on the exterior of the vehicle 100 in order to sense an object ahead of, behind, or on a side of the vehicle 100.

The ultrasonic sensor 340 may include an ultrasonic wave transmitter and an ultrasonic wave receiver. The ultrasonic sensor 340 may detect an object by ultrasonic waves, and determine the location, distance, and relative speed of the detected object.

The ultrasonic sensor 340 may be disposed at an appropriate position on the exterior of the vehicle 100 in order to sense an object ahead of, behind, or on a side of the vehicle 100.

The IR sensor 350 may include an IR transmitter and an IR receiver. The IR sensor 350 may detect an object by IR light, and determine the location, distance, and relative speed of the detected object.

The IR sensor 350 may be disposed at an appropriate position on the exterior of the vehicle 100 in order to sense an object ahead of, behind, or on a side of the vehicle 100.

The processor 370 may control an overall operation of each unit of the object detection device 300.

The processor 370 may compare data sensed by the camera 310, the RADAR 320, the LiDAR 330, the ultrasonic sensor 340, and the IR sensor 350 with pre-stored data to detect or classify an object.

The processor 370 may detect and track an object based on the acquired image. The processor 370 may calculate a distance to the object, a relative speed with respect to the object, and so on by an image processing algorithm.

For example, the processor 370 may acquire information about a distance to an object and information about a relative speed with respect to the object from an acquired image, based on a variation in the size of the object over time.

For example, the processor 370 may acquire information about a distance to an object and information about a relative speed with respect to the object from an image acquired from the stereo camera 310*a*.

For example, the processor 370 may acquire information about a distance to an object and information about a relative speed with respect to the object from an image acquired from the stereo camera 310*a*, based on disparity information.

The processor 370 may detect an object and track the detected object based on electromagnetic waves which are transmitted, are reflected from an object, and then return. The processor 370 may calculate a distance to the object and a relative speed with respect to the object, based on the electromagnetic waves.

The processor 370 may detect an object and track the detected object based on laser light which is transmitted, is reflected from an object, and then returns. The sensing processor 370 may calculate a distance to the object and a relative speed with respect to the object, based on the laser light.

The processor 370 may detect an object and track the detected object based on ultrasonic waves which are transmitted, are reflected from an object, and then return. The processor 370 may calculate a distance to the object and a relative speed with respect to the object, based on the ultrasonic waves.

The processor 370 may detect an object and track the detected object based on IR light which is transmitted, is reflected from an object, and then returns. The processor 370 may calculate a distance to the object and a relative speed with respect to the object, based on the IR light.

In some embodiments, the object detection device 300 may include a plurality of processors 370 or no processor 370. For example, the camera 310, the RADAR 320, the LiDAR 330, the ultrasonic sensor 340, and the IR sensor 350 may include individual processors.

If the object detection device 300 includes no processor 370, the object detection device 300 may operate under control of a processor of a device in the vehicle 100 or under control of the controller 170.

The object detection device 300 may operate under control of the controller 170.

The communication device 400 is used to communicate with an external device. The external device may be another vehicle, a mobile terminal, or a server.

The communication device 400 may include at least one of a transmit antenna and a receive antenna, for communication, or a Radio Frequency (RF) circuit and device, for implementing various communication protocols.

The communication device 400 may include a short-range communication unit 410, a location information unit 420, a vehicle-to-everything (V2X) communication unit 430, an optical communication unit 440, a broadcasting transceiver unit 450, an intelligent transport system (ITS) communication unit 460, and a processor 470.

In some embodiments, the communication device 400 may further include a new component in addition to components described below, or may not include a part of the described components.

The short-range communication module 410 is a unit for conducting short-range communication. The short-range communication module 410 may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit 410 may conduct short-range communication between the vehicle 100 and at least one external device by establishing a wireless area network.

The location information unit 420 is a unit configured to acquire information about a location of the vehicle 100. The location information unit 420 may include at least one of a global positioning system (GPS) module or a Differential Global Positioning System (DGPS) module.

The V2X communication unit 430 is a unit used for wireless communication with a server (by vehicle-to-infrastructure (V2I)), another vehicle (by Vehicle to Vehicle (V2V)), or a pedestrian (by Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal to an optical signal and emitting the optical signal to the outside, and an optical receiver for converting a received optical signal to an electrical signal.

In some embodiments, the optical transmitter may be integrated with a lamp included in the vehicle 100.

The broadcasting transceiver unit 450 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and provide the received control signal to the controller 170 or a processor in the vehicle 100.

The processor 470 may control an overall operation of each unit of the communication device 400.

In some embodiments, the communication device 400 may include a plurality of processors 470 or no processor 470.

If the communication device 400 does not include any processor 470, the communication device 400 may operate under control of a processor of another device in the vehicle 100 or under control of the controller 170.

The communication device 400 may be configured along with the UI device 200, as a vehicle multimedia device. In this case, the vehicle multimedia device may be referred to as a telematics device or an Audio Video Navigation (AVN) device.

The communication device 400 may operate under control of the controller 170.

The driving manipulation device 500 is used to receive a user command for driving the vehicle 100.

In the manual mode, the vehicle 100 may travel based on a signal provided by the driving manipulation device 500.

The driving manipulation device 500 may include the steering input device 510, an acceleration input device 530, and a brake input device 570.

The steering input device 510 may receive a travel direction input for the vehicle 100 from a user. The steering input device 510 may take the form of a wheel to rotate to provide a steering input. In some embodiments, the steering input device 510 may be configured as a touch screen, a touchpad, or a button.

The acceleration input device 530 may receive an input for acceleration of the vehicle 100 from the user. The brake input device 570 may receive an input for deceleration of the vehicle 100 from the user. The acceleration input device 530 and the brake input device 570 are preferably formed into pedals. In some embodiments, the acceleration input device 530 or the brake input device 570 may be configured as a touch screen, a touchpad, or a button.

The driving manipulation device 500 may operate under control of the controller 170.

The vehicle driving device 600 is used to electrically control operations of various devices of the vehicle 100.

The vehicle driving device 600 may include at least one of a power train driving unit 610, a chassis driving unit 620, a door/window driving unit 630, a safety device driving unit 640, a lamp driving unit 650, or an air conditioner driving unit 660.

In some embodiments, the vehicle driving device 600 may further include a new component in addition to components described below or may not include a part of the components.

The vehicle driving device 600 may include a processor. Each unit of the vehicle driving device 600 may include a processor.

The power train driving unit 610 may control operation of a power train device.

The power train driving unit 610 may include a power source driver 611 and a transmission driver 612.

The power source driver 611 may control a power source of the vehicle 100.

For example, if the power source is a fossil fuel-based engine, the power source driver 610 may perform electronic control on the engine. Therefore, the power source driver 611 may control an output torque of the engine, and the like. The power source driver 611 may adjust the engine output torque under control of the controller 170.

For example, if the power source is an electrical energy-based motor, the power source driver 610 may control the motor. The power source driver 610 may adjust a rotation speed, torque, and so on of the motor under control of the controller 170.

The transmission driver 612 may control a transmission.

The transmission driver 612 may adjust a state of the transmission. The transmission driver 612 may adjust the state of the transmission to drive D, reverse R, neutral N, or park P.

If the power source is the engine, the transmission driver 612 may adjust the engagement state of gears in the drive mode D.

The chassis driving unit 620 may control operation of a chassis device.

The chassis driving unit 620 may include a steering driver 621, a brake driver 622, and a suspension driver 623.

The steering driver 621 may perform electronic control on a steering device in the vehicle 100. The steering driver 621 may change a travel direction of the vehicle 100.

The brake driver 622 may perform electronic control on a brake device in the vehicle 100. For example, the brake driver 622 may decrease the speed of the vehicle 100 by controlling an operation of a brake disposed at a wheel.

The brake driver 622 may control a plurality of brakes individually. The brake driver 622 may control braking power applied to a plurality of wheels differently.

The suspension driver 623 may perform electronic control on a suspension device in the vehicle 100. For example, if the surface of a road is rugged, the suspension driver 623 may control the suspension device to reduce jerk of the vehicle 100.

The suspension driver 623 may control a plurality of suspensions individually.

The door/window driving unit 630 may perform electronic control on a door device or a window device in the vehicle 100.

The door/window driving unit 630 may include a door driver 631 and a window driver 632.

The door driver 631 may perform electronic control on a door device in the vehicle 100. For example, the door driver 631 may control opening and closing of a plurality of doors in the vehicle 100. The door driver 631 may control opening or closing of the trunk or the tail gate. The door driver 631 may control opening or closing of the sunroof.

The window driver 632 may perform electronic control on a window device in the vehicle 100. The window driver 632 may control opening or closing of a plurality of windows in the vehicle 100.

The safety device driving unit 640 may perform electronic control on various safety devices in the vehicle 100.

The safety device driving unit 640 may include an airbag driver 641, a seatbelt driver 642, and a pedestrian protection device driver 643.

The airbag driver 641 may perform electronic control on an airbag device in the vehicle 100. For example, the airbag driver 641 may control inflation of an airbag, upon sensing an emergency situation.

The seatbelt driver 642 may perform electronic control on a seatbelt device in the vehicle 100. For example, the seatbelt driver 642 may control securing of passengers on the seats 110FL, 110FR, 110RL, and 110RR by means of seatbelts, upon sensing a danger.

The pedestrian protection device driver 643 may perform electronic control on a hood lift and a pedestrian airbag. For example, the pedestrian protection device driver 643 may control the hood to be lifted up and the pedestrian airbag to be inflated, upon sensing collision with a pedestrian.

The lamp driving unit 650 may perform electronic control on various lamp devices in the vehicle 100.

The air conditioner driving unit 660 may perform electronic control on an air conditioner in the vehicle 100. For example, if a vehicle internal temperature is high, the air conditioner driver 660 may control the air conditioner to operate and supply cool air into the vehicle 100.

The vehicle driving device 600 may include a processor. Each unit of the vehicle driving device 600 may include a processor.

The vehicle driving device 600 may operate under control of the controller 170.

The operation system 700 is a system that controls various operations of the vehicle 100. The operation system 700 may operate in the autonomous driving mode.

The operation system 700 may include the traveling system 710, the park-out system 740, and the park-in system 750.

In some embodiments, the operation system 700 may further include a new component in addition to components described below or may not include a part of the described components.

The operation system 700 may include a processor. Each unit of the operation system 700 may include a processor.

In some embodiments, if the operation system 700 is implemented in software, the operation system 700 may lie under the controller 170 in concept.

In some embodiments, the operation system 700 may conceptually include at least one of the UI device 270, the object detection device 300, the communication device 400, the driving manipulation device 500, the vehicle driving device 600, the navigation system 770, the sensing unit 120, or the controller 170.

The traveling system 710 may drive the vehicle 100.

The traveling system 710 may drive the vehicle 100 by providing a control signal to the vehicle driving device 600 based on navigation information received from the navigation system 770.

The traveling system 710 may drive the vehicle 100 by providing a control signal to the vehicle driving device 600 based on object information received from the object detection device 300.

The traveling system 710 may drive the vehicle 100 by receiving a signal from an external device through the communication device 400 and providing a control signal to the vehicle driving device 600.

The traveling system 710 may include at least one of the UI device 270, the object detection device 300 and the communication device 400, the driving manipulation device 500, the vehicle driving device 600, the navigation system 770, the sensing unit 120, and the controller 170 and may be conceptually a system for performing traveling of the vehicle 100.

The traveling system 710 may be referred to as a vehicle traveling control apparatus.

The park-out system 740 may perform park-out of the vehicle 100.

The park-out system 740 may perform park-out of the vehicle 100 by providing a control signal to the vehicle driving device 600 according to navigation information received from the navigation system 770.

The park-out system 740 may perform park-out of the vehicle 100 by providing a control signal to the vehicle driving device 600 based on object information received from the object detection device 300.

The park-out system 740 may perform park-out of the vehicle 100 by receiving a signal from an external device through the communication device 400 and providing a control signal to the vehicle driving device 600.

The park-out system 740 may include at least one of the UI device 270, the object detection device 300, the communication device 400, the driving manipulation device 500, the vehicle driving device 600, the navigation system 770, the sensing unit 120, or the controller 170 and may be conceptually a system for performing park-out of the vehicle 100.

The park-out system 740 may be referred to as a vehicle park-out control apparatus.

The park-in system 750 may perform park-in of the vehicle 100.

The park-in system 750 may perform park-in of the vehicle 100 by providing a control signal to the vehicle driving device 600 according to navigation information received from the navigation system 770.

The park-in system 750 may perform park-in of the vehicle 100 by providing a control signal to the vehicle driving device 600 based on object information received from the object detection device 300.

The park-in system 750 may perform park-in of the vehicle 100 by providing a control signal to the vehicle driving device 600 according to a signal received from an external device via the communication device 400.

The park-in system 750 may include at least one of the UI device 270, the object detection device 300, the communication device 400, the driving manipulation device 500, the vehicle driving device 600, the navigation system 770, the sensing unit 120, or the controller 170 and may be conceptually a system for performing park-in of the vehicle 100.

The park-in system 750 may be referred to as a vehicle park-in control apparatus.

The navigation system 770 may provide navigation information. The navigation information may include at least one of map information, set destination information, route information based on setting of a destination, information about various objects on a route, lane information, or information about a current location of a vehicle.

The navigation system 770 may include a memory and a processor. The memory may store navigation information. The processor may control operation of the navigation system 770.

In some embodiments, the navigation system 770 may receive information from an external device via the communication device 400 and update pre-stored information with the received information.

In some embodiments, the navigation system 770 may be classified as a lower-level component of the UI device 200.

The sensing unit 120 may sense a vehicle state. The sensing unit 120 may include an attitude sensor (e.g., a yaw sensor, a roll sensor, or a pitch sensor), a collision sensor, a wheel sensor, a speed sensor, an inclination sensor, a weight detection sensor, a heading sensor, a gyro sensor, a position module, a vehicle drive/reverse sensor, a battery sensor, a fuel sensor, a tier sensor, a steering sensor for rotation of the steering wheel, an in-vehicle temperature sensor, an in-vehicle humidity sensor, an ultrasonic sensor, an illuminance sensor, an acceleration pedal position sensor, a brake pedal position sensor, and so on.

The sensing unit 120 may acquire a sensing signal of vehicle position information, vehicle collision information, vehicle heading information, vehicle location information (GPS information), vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, a pressure applied to an accelerator pedal, a pressure applied to a brake pedal, and so on.

The sensing unit 120 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 120 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The interface unit 130 serves paths to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

The interface unit 130 may serve as a path along which electric energy is supplied to a connected mobile terminal. When the mobile terminal is conductibly connected to the interface unit 130, the interface unit 130 may supply electric energy received from the power supply 190 to the mobile terminal under control of the controller 170.

The memory 140 is conductibly connected to the controller 170. The memory 140 may store default data for a unit, control data for controlling the operation of the unit, and input and output data. The memory 140 may be any of various storage devices in hardware, such as read only memory (ROM), random access memory (RAM), erasable and programmable ROM (EPROM), flash drive, and hard drive. The memory 140 may store various data for an overall operation of the vehicle 100, such as programs for processing or control in the controller 170.

In some embodiments, the memory 140 may be integrated with the controller 170, or configured as a lower level component of the controller 170.

The controller 170 may control an overall operation of each unit in the vehicle 100. The controller 170 may be referred to as an electronic control unit (ECU).

The power supply 190 may supply power required for an operation of each component under control of the controller 170. In particular, the power supply 190 may receive power from a battery, etc. in the vehicle.

One or more processors and the controller 170, included in the vehicle 100, may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

As described above, the vehicle 100 may include various electronic devices such as the UI device 200, the object detection device 300, the communication device 400, the driving manipulation device 500, the controller 170, the vehicle driving device 600, the operating system 700, the navigation system 770, the sensing unit 120, the interface unit 130, a memory 140, and the power supply 190.

A vehicular electronic device may be communication-connected to a system outside the vehicle 100. For example, the vehicular electronic device may be communication-connected to a system outside the vehicle 100 through a gateway inside the vehicle 100. Here, the gateway may be on-board diagnostics (OBD) or on-board diagnostic version 2 (OBD 2).

Wired communication or wireless communication may be performed between vehicular electronic devices. For example, communication may be performed between vehicular electronic devices through a controller area network (CAN).

The vehicular electronic device may be communication-connected to a system outside the vehicle 100 by wire or wirelessly. For example, the vehicular electronic device may be communication-connected to an external device of the vehicle 100 through a Wi-Fi protocol or a Bluetooth protocol.

The system outside the vehicle 100 may include a server, a computer, a mobile terminal, a clouding service, and a network.

The vehicular electronic device may receive a file or data from the system outside the vehicle 100. For example, the vehicular electronic device may receive a firmware upgrade file from the system outside the vehicle 100 and may update firmware.

Communication-connection between the vehicular electronic device and the system outside the vehicle 100 may be a target of hacking.

For example, a hacker may access a vehicular electronic device through a gateway or a CAN and may induce an abnormal operation of the vehicular electronic device.

For example, the hacker may mutate an access point connection protocol and may attack the UI device 200 for a vehicle when the UI device 200 for a vehicle operates as a Wi-Fi access point.

For example, the hacker may attack and take control of an access point, and then may attack the UI device 200 for a vehicle using a Wi-Fi protocol when the UI device 200 for a vehicle operates as a Wi-Fi station.

For example, the hacker may mutate and attack a Bluetooth profile/protocol packet (e.g., L2CAP, RFCOMN, OBEX, or SDP).

For example, the hacker may change and attaché firmware of the vehicular electronic device. In detail, the hacker may execute buffer overflow attack through firmware hacking.

A vehicular electronic device hacking test apparatus 800 may be communication-connected to the vehicular electronic device by wire or wirelessly. The vehicular electronic device hacking test apparatus 800 may determine whether the vehicular electronic device is vulnerable to hacking in response to a state classified according to a preset communication protocol.

For example, the vehicular electronic device hacking test apparatus 800 may determine whether the vehicular electronic device is vulnerable to hacking in response to a state classified according to a Wi-Fi protocol.

For example, the vehicular electronic device hacking test apparatus 800 may determine whether the vehicular electronic device is vulnerable to hacking in response to a state classified according to a Bluetooth protocol.

Figure 3:
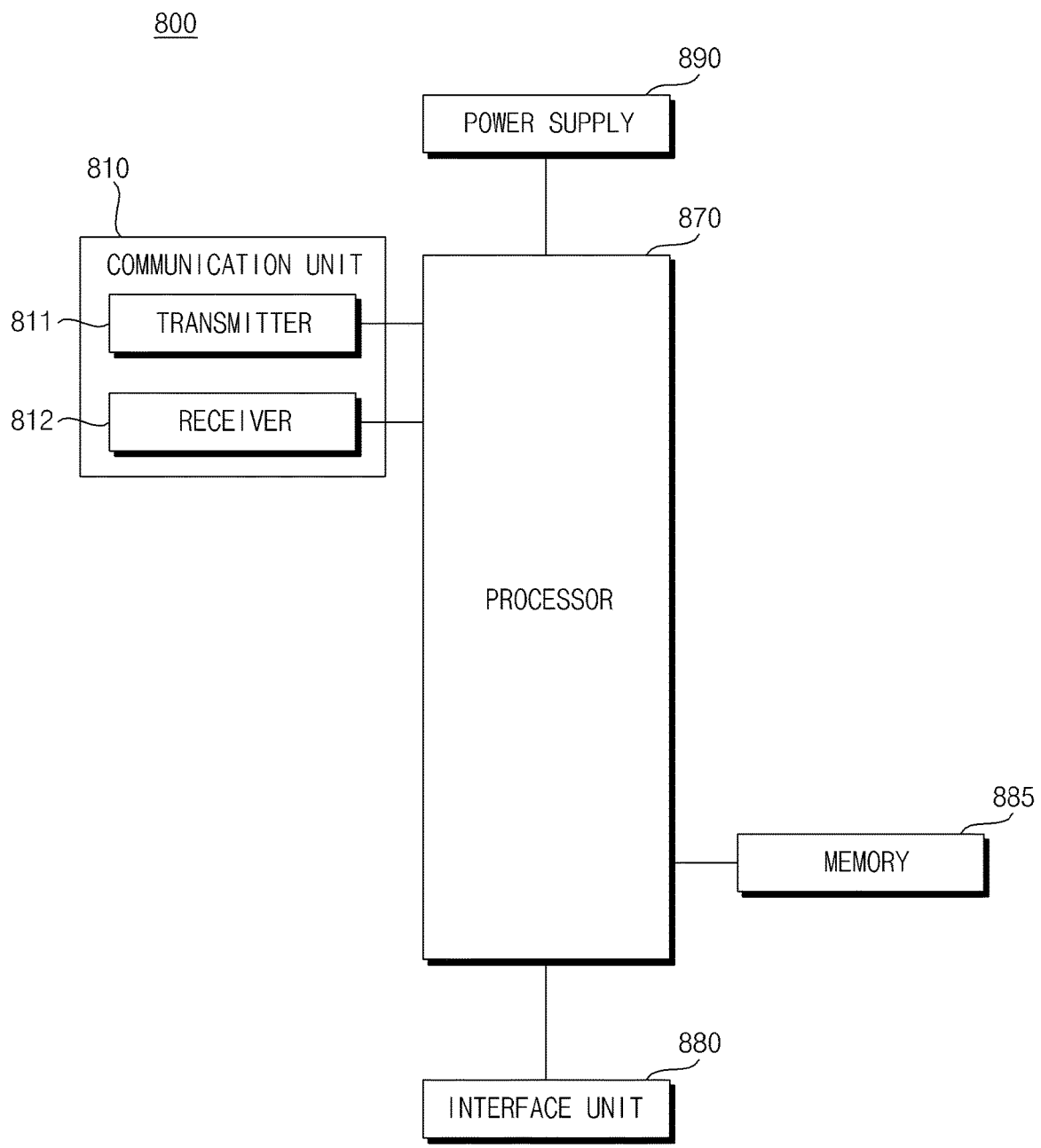
FIG. 3 is a block diagram for explanation of a vehicular electronic device hacking test apparatus according to an embodiment of the present invention.

FIG. 3 is a block diagram for explanation of a vehicular electronic device hacking test apparatus according to an embodiment of the present invention.

Referring to FIG. 3, the vehicular electronic device hacking test apparatus 800 may include a communication unit 810, a processor 870, an interface unit 880, a memory 885, and a power supply 890.

The communication unit 810 may be communication-connected to the vehicular electronic device by wire or wirelessly. The communication unit 810 may be communication-connected to the vehicular electronic device based on a preset communication protocol.

The communication unit 810 may include a transmitter 811 and a receiver 812.

The transmitter 811 may transmit data to the vehicular electronic device by wire or wirelessly.

The transmitter 811 may transmit data to the vehicular electronic device based on a preset wireless communication protocol. In this case, the transmitter 811 may include a transmission radio frequency (RF) circuit appropriate for a wireless communication protocol.

The receiver 812 may receive data from the vehicle electronic device by wire or wirelessly.

The receiver 812 may receive data from the vehicular electronic device based on a preset wireless communication protocol. In this case, the receiver 812 may include a reception radio frequency (RF) circuit appropriate for a wireless communication protocol.

The processor 870 may control an overall operation of each unit of the vehicular electronic device hacking test apparatus 800.

The processor 870 may control the transmitter 811 to transmit data to the vehicle electronic device. For example, the processor 870 may control the transmitter 811 to transmit a mutated packet.

The processor 870 may control the transmitter 811 to transmit data to the vehicle electronic device based on a preset communication protocol.

The processor 870 may control the receiver 812 to receive data from the vehicle electronic device.

The processor 870 may control the receiver 812 to receive data from the vehicle electronic device based on a preset communication protocol.

The processor 870 may classify a communication-connection procedure into a plurality of states based on a preset communication protocol.

For example, the Wi-Fi access point may have a state such as a probe request listening state, an association listening state, and a connected state. When determining whether the vehicular electronic device that operates as a Wi-Fi access point is vulnerable to hacking, the processor 870 may classify a communication-connection procedure into states such as a probe request listening state, an association listening state, and a connected state.

The processor 870 may generate the mutated packet appropriate for a plurality of states. The processor 870 may transmit the mutated packet to the vehicular electronic device through the transmitter 811.

The processor 870 may generate the mutated packet corresponding to a plurality of states. The processor 870 may transmit the mutated packet to the vehicular electronic device through the transmitter 811.

For example, the processor 870 may generate the mutated packet appropriate for a plurality of states via a fuzzing scheme.

For example, the processor 870 may generate the mutated packet corresponding to a plurality of states via a fuzzing scheme.

For example, the processor 870 may arbitrarily mutate a portion of an original packet to be transmitted in a plurality of states to generate the mutated packet.

For example, the vehicular electronic device hacking test apparatus 800 may determine whether the vehicular electronic device that operates as a Wi-Fi access point is vulnerable to hacking. In this case, the processor 870 may arbitrarily mutate a portion of an original packet to be transmitted in each of a probe request listening state, an association listening state, and a connected state to generate the mutated packet. Then, the processor 870 may transmit the mutated packet to the vehicular electronic device in each of the probe request listening state, the association listening state, and the connected state.

The processor 870 may determine whether the vehicular electronic device is vulnerable to hacking based on whether a reception packet to the mutated packet is received through the receiver 812.

For example, when a normal reception packet is received, the processor 870 may determine whether the vehicular electronic device is not vulnerable to hacking.

For example, when the normal reception packet is not received, the processor 870 may determine whether the vehicular electronic device is vulnerable to hacking. When a reception packet is not received, the processor 870 may determine whether the vehicular electronic device is vulnerable to hacking. When an abnormal packet is received, the processor 870 may determine whether the vehicular electronic device is vulnerable to hacking.

The processor 870 may classify a communication-connection procedure with the vehicular electronic device into a first state, a second state, and a third state.

Here, classification into a plurality of states may be exemplary and may be defined according to a preset communication protocol.

According to the present embodiment, although classification into three states is exemplified, the processor 870 may also classify a communication-connection procedure into two states or four or more states.

The processor 870 may generate a first mutated packet appropriate for the first state and may transmit the first mutated packet to the vehicular electronic device through the transmitter 811.

The processor 870 may generate the first mutated packet corresponding to the first state and may transmit the first mutated packet to the vehicular electronic device through the transmitter 811.

When a first reception packet corresponding to the first mutated packet is received from the vehicular electronic device through the receiver 812 in the first state, the processor 870 may generate a second mutated packet appropriate for the second state.

When the first reception packet corresponding to the first mutated packet is received from the vehicular electronic device through the receiver 812 in the first state, the processor 870 may generate the second mutated packet corresponding to the second state.

When the first reception packet is not received through the receiver 812 in the first state, the processor 870 may determine that the vehicular electronic device is vulnerable to hacking. For example, when the first reception packet is not received through the receiver 812 for a preset time or more, the processor 870 may determine that the vehicular electronic device is vulnerable to hacking.

When the first reception packet corresponding to the first mutated packet is not received from the vehicular electronic device through the receiver 812, the processor 870 may repeatedly generate the first mutated packet and may transmit the first mutated packet to the vehicular electronic device through the transmitter 811.

When the number of times the first mutated packet is repeatedly generated is equal to or greater than a preset number of times, the processor 870 may determine that the vehicular electronic device is vulnerable to hacking.

When the number of times the first mutated packet is repeatedly transmitted is equal to or greater than a preset number of times, the processor 870 may determine that the vehicular electronic device is vulnerable to hacking.

The processor 870 may transmit the generated second mutated packet to the vehicular electronic device through the transmitter 811.

When a second reception packet corresponding to the second mutated packet is received, the processor 870 may generate a mutated packet appropriate for another state and may transmit the mutated packet to the vehicular electronic device through the transmitter 811.

When the second reception packet corresponding to the second mutated packet is received, the processor 870 may generate a mutated packet corresponding to another state and may transmit the mutated packet to the vehicular electronic device through the transmitter 811.

The processor 870 may receive the second reception packet and may randomly determine a next state. The processor 870 may generate a mutated packet appropriate for the randomly determined state and may transmit the mutated packet to the vehicular electronic device through the transmitter 811.

The processor 870 may receive the second reception packet and may randomly determine a next state. The processor 870 may generate a mutated packet corresponding to the randomly determined state and may transmit the mutated packet to the vehicular electronic device through the transmitter 811.

When the second reception packet corresponding to the second mutated packet is received, the processor 870 may generate a third mutated packet appropriate for the third state. The processor 870 may transmit the generated third mutated packet to the vehicular electronic device through the transmitter 811.

When the second reception packet corresponding to the second mutated packet is received, the processor 870 may generate the third mutated packet corresponding to the third state. The processor 870 may transmit the generated third mutated packet to the vehicular electronic device through the transmitter 811.

When the second reception packet corresponding to the second mutated packet is received, the processor 870 may generate the first mutated packet appropriate for the first state. The processor 870 may transmit the generated first mutated packet to the vehicular electronic device through the transmitter 811.

When the second reception packet corresponding to the second mutated packet is received, the processor 870 may generate the first mutated packet corresponding to the first state. The processor 870 may transmit the generated second mutated packet to the vehicular electronic device through the transmitter 811.

The interface unit 880 may exchange information, a signal, or data with other device. The interface unit 880 may receive information, a signal, or data from other device. The interface unit 880 may transmit the received information, signal, or data to the processor 870. The interface unit 880 may transmit information, a signal, or data, which is generated or processed by the processor 870, to other device.

The memory 885 may be conductibly connected to the processor 870. The memory 885 may store basic data of a unit, control data for control of an operation of the unit, and input and output data. The memory 885 may be various storage devices such as ROM, RAM, EPROM, a flash drive, or a hard drive in terms of hardware. The memory 885 may store various data for an overall operation of the vehicular electronic device hacking test apparatus 800, such as a program for processing or control of the processor 870.

In some embodiments, the memory 885 may be integrally formed with the processor 870 or may be a component that lies under the processor 870.

The power supply 890 may supply power required for an operation of each component under control of the processor 870. In particular, the power supply 890 may receive power from a battery inside a vehicle, or the like.

Figure 4:
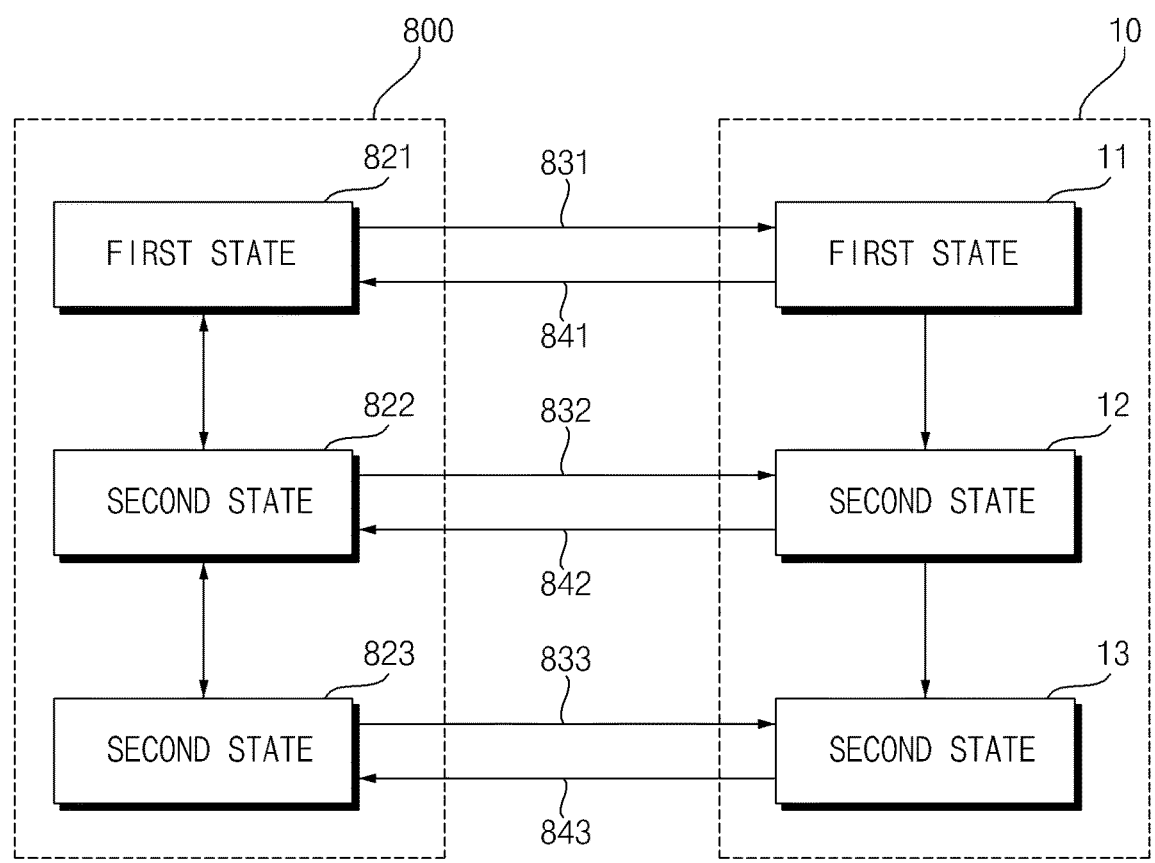
FIG. 4 is a diagram for explanation of an operation of a vehicular electronic device hacking test apparatus according to an embodiment of the present invention.

FIG. 4 is a diagram for explanation of an operation of a vehicular electronic device hacking test apparatus according to an embodiment of the present invention.

Referring to FIG. 4, a vehicular electronic device 10 may include at least one of the UI device 200, the object detection device 300, the communication device 400, the driving manipulation device 500, the controller 170, the vehicle driving device 600, the operating system 700, the navigation system 770, the sensing unit 120, the interface unit 130, the memory 140, or the power supply 190.

The processor 870 may be communication-connected to the vehicular electronic device 10.

The processor 870 may classify a communication-connection procedure with the vehicular electronic device 10 into a first state 821, a second state 822, and a third state 823 based on a preset communication protocol.

The processor 870 may enter the first state 821, may generate a first mutated packet 831 appropriate for (or corresponding to) the first state 821, and may transmit the same to the vehicular electronic device 10. Here, the first mutated packet 831 may be a packet formed by arbitrarily mutating a portion of the original packet to be transmitted in the first state 821.

The processor 870 may determine whether a first reception packet 841 corresponding to the first mutated packet 831 is received from the vehicular electronic device 10. Here, the first reception packet 841 may be a response packet that is generated in response to the first mutated packet 831 in a first state 11 by the vehicular electronic device 10.

When the first reception packet 841 is received and is determined to be the same reception packet as a reception packet corresponding to the original packet, the processor 870 may determine that the vehicular electronic device 10 is not vulnerable to hacking in the first state 821.

When the first reception packet 841 is not received or is different from a reception packet corresponding to the original packet and is determined to be an abnormal reception packet, the processor 870 may determine that the vehicular electronic device 10 is vulnerable to hacking in the first state 821.

The first reception packet 831 may be received, and then the processor 870 may be converted into the second state 821.

The processor 870 may enter the second state 822, may generate a second mutated packet 832 appropriate for (or corresponding to) the second state 822, and may transmit the same to the vehicular electronic device 10. Here, the second mutated packet 832 may be a packet formed by arbitrarily mutating a portion of the original packet to be transmitted in the second state 822.

The processor 870 may determine whether a second reception packet 842 corresponding to the second mutated packet 832 is received from the vehicular electronic device 10. Here, the second reception packet 842 may be a response packet that is generated in response to the second mutated packet 832 in a second state 12 by the vehicular electronic device 10.

When the second reception packet 842 is received and is determined to be the same reception packet as a reception packet corresponding to the original packet, the processor 870 may determine that the vehicular electronic device 10 is not vulnerable to hacking in the second state 822.

When the second reception packet 842 is not received or is different from a reception packet corresponding to the original packet and is determined to be an abnormal reception packet, the processor 870 may determine that the vehicular electronic device 10 is vulnerable to hacking in the second state 822.

The second reception packet 832 may be received, and then the processor 870 may be converted into a third state 823.

The processor 870 may enter the third state 823, may generate a third mutated packet 833 appropriate for (or corresponding to) the third state 823, and may transmit the same to the vehicular electronic device 10. Here, the third mutated packet 833 may be a packet formed by arbitrarily mutating a portion of the original packet to be transmitted in the third state 823.

The processor 870 may determine whether a third reception packet 843 corresponding to the third mutated packet 833 is received from the vehicular electronic device 10. Here, the third reception packet 843 may be a response packet that is generated in response to the third mutated packet 833 in a third state 13 by the vehicular electronic device 10.

When the third reception packet 843 is received and is determined to be the same reception packet as a reception packet corresponding to the original packet, the processor 870 may determine that t the vehicular electronic device 10 is not vulnerable to hacking in the third state 823.

When the third reception packet 843 is not received or is different from a reception packet corresponding to the original packet and is determined to be an abnormal reception packet, the processor 870 may determine that the vehicular electronic device 10 is vulnerable to hacking in the third state 823.

The second reception packet 832 may be received in the second state 822, and then the processor 870 may return back to the first state 821.

In this case, the processor 870 may re-generate the first mutated packet 831 and may transmit the same to the vehicular electronic device 10.

Figure 5:
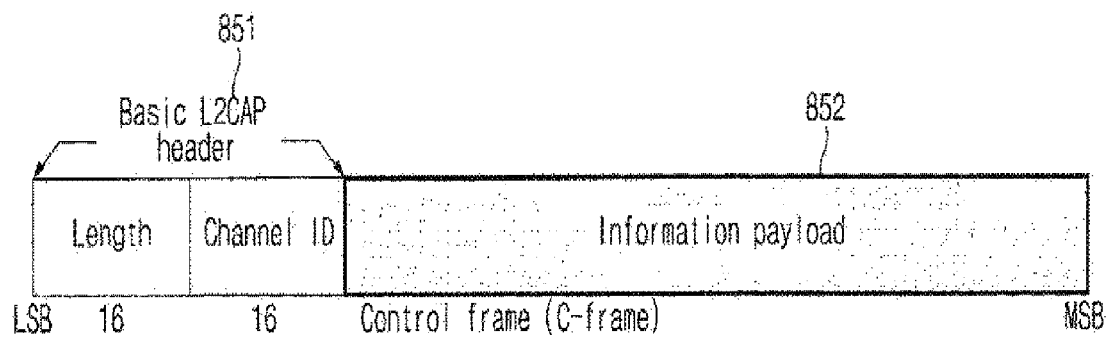
FIG. 5 is a diagram for explanation of an operation of generating a mutated packet according to an embodiment of the present invention.

FIG. 5 is a diagram for explanation of an operation of generating a mutated packet according to an embodiment of the present invention.

FIG. 6 is a diagram for explanation of a mutated packet implemented in a hexadecimal digit according to an embodiment of the present invention.

Referring to FIGS. 5 and 6, the processor 870 may mutate an original packet 861 for each field to generate a mutated packet.

The original packet 861 may be defined as a data packet to be transmitted in any one of a plurality of states classified based on a preset communication protocol.

The original packet 861 may be divided into a header and an information payload.

The processor 870 may mutate a region except for the header among original packets appropriate for (or corresponding to) a plurality of states to generate a mutated packet 862.

When a region including the header is mutated to generate a mutated packet, the mutated packet is against a basic structure, and thus the vehicular electronic device 10 may not process the corresponding packet.

When the region except for the header is mutated to generate the mutated packet 862, an arbitrary field may be modulated to an arbitrary value while a field structure defined depending on each state of a communication protocol is maintained, and thus the vehicular electronic device 10 may process a corresponding packet. In this case, whether the vehicular electronic device 10 is vulnerable to hacking may be more effectively tested.

When a protocol is processed, there is a routine for processing each field. Hacking vulnerability occurs because exceptional processing is not performed in the routine for processing each field. For example, when a length field of a protocol is not examined, there is possibility that buffer overflow vulnerability occurs.

The processor 870 may mutate an arbitrary portion of an information payload of the original packet to generate the mutated packet 862.

The processor 870 may contain a larger amount of data than the original packet 861 appropriate for (or corresponding to) a plurality of states and may generate the mutated packet 862.

For example, the processor 870 may contain a larger amount of data than original data in an information payload region of the original packet 861 and may generate the mutated packet 862.

Upon receiving a larger amount of data than the original packet 861, memory capacity of the vehicular electronic device 10, which is allocated according to a protocol, may be exceeded, and thus the vehicular electronic device 10 may malfunction. Such hack attack may be referred to as buffer overflow.

Through such a test procedure, the vehicular electronic device hacking test apparatus 800 may check whether it is possible to attack the vehicular electronic device via buffer overflow.

Figure 7:
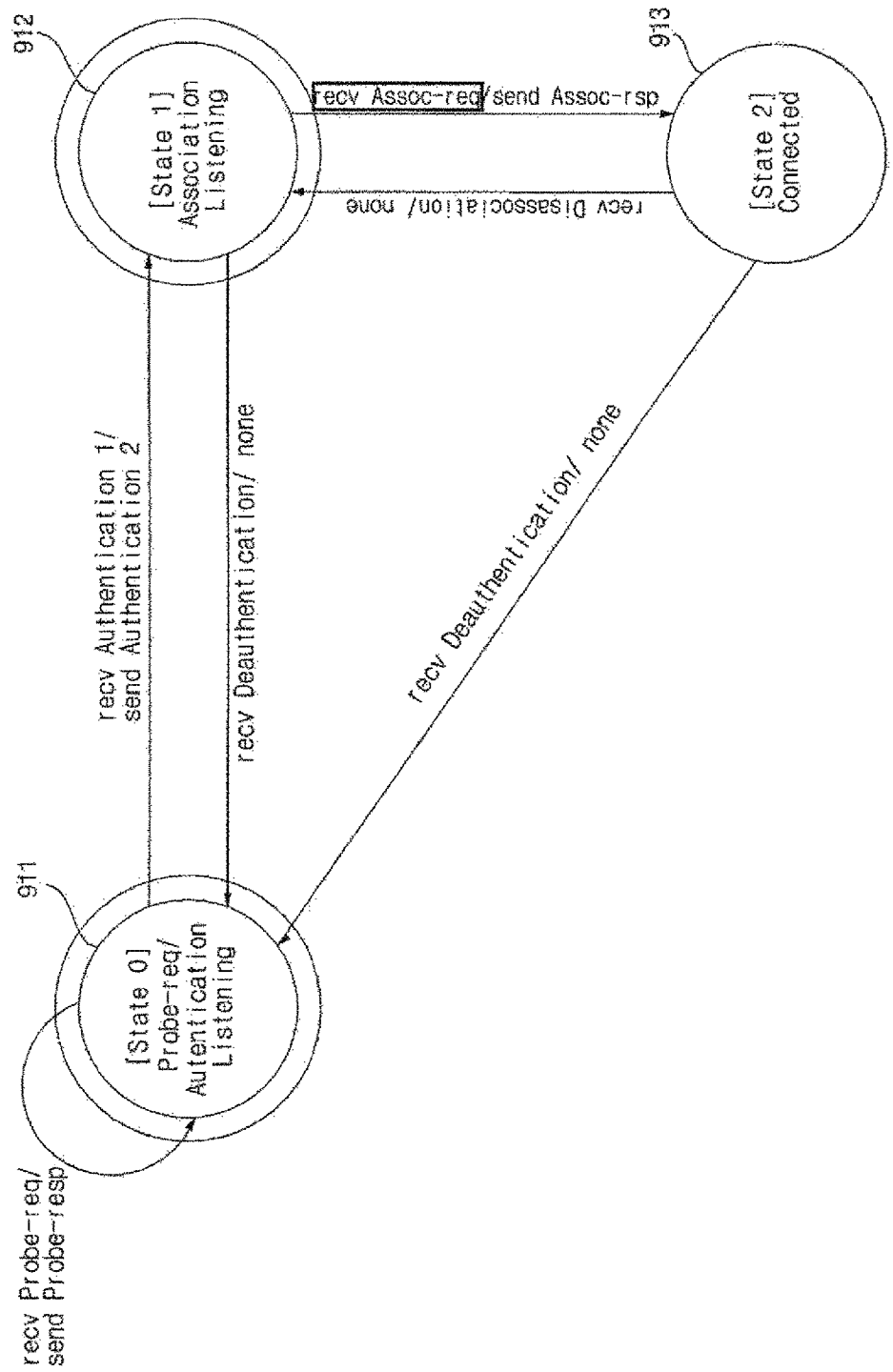
FIGS. 7 and 8 are diagrams for explanation of a vehicular electronic device hacking test apparatus based on Wi-Fi protocol according to an embodiment of the present invention.
Figure 8:
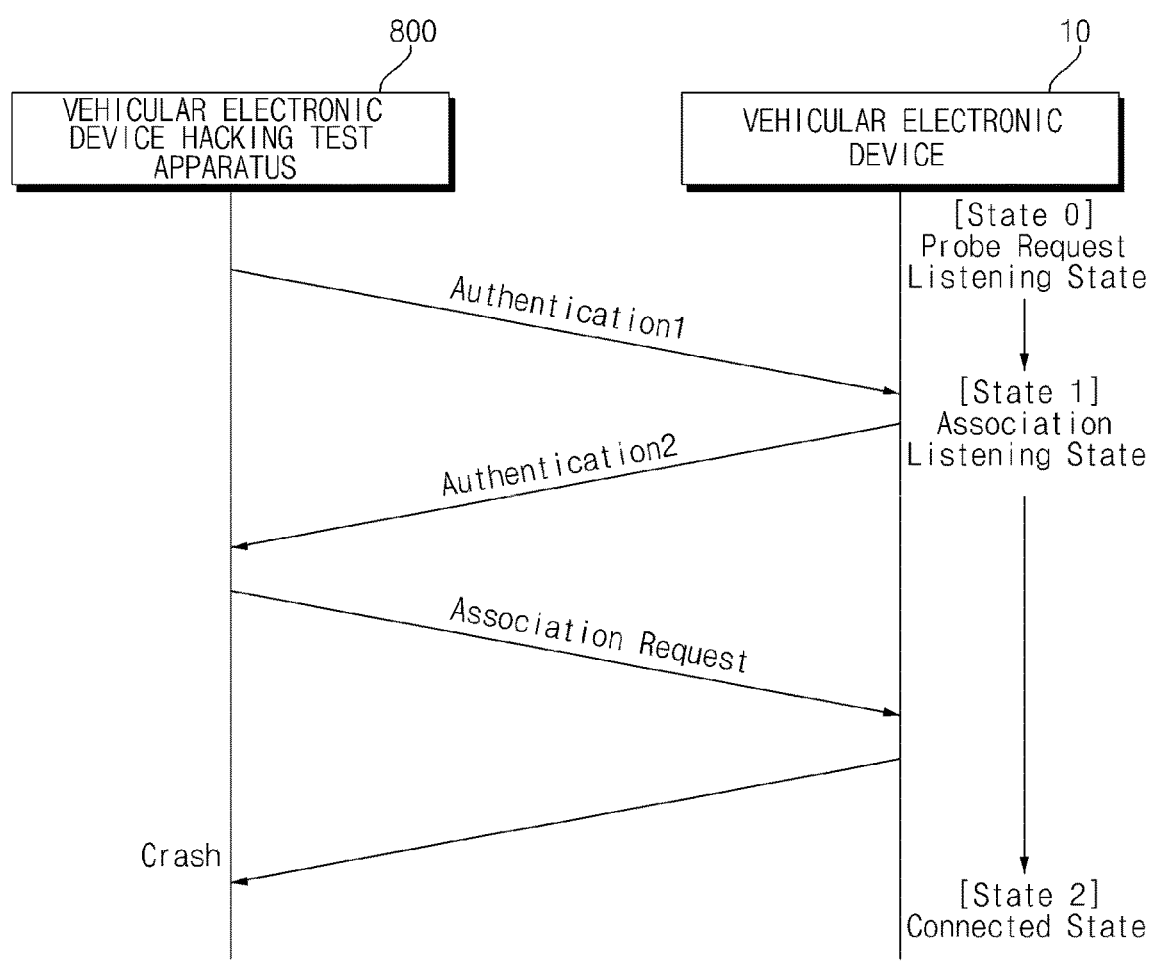

FIGS. 7 and 8 are diagrams for explanation of a vehicular electronic device hacking test apparatus based on Wi-Fi protocol according to an embodiment of the present invention.

FIGS. 7 and 8 are diagrams for explanation of an operation of the vehicular electronic device hacking test apparatus 800 when the vehicular electronic device 10 operates as a Wi-Fi access point.

In FIGS. 7 and 8, the vehicular electronic device hacking test apparatus 800 may operate as a Wi-Fi client (or a station).

The processor 870 may classify a communication-connection procedure into a plurality of states based on a Wi-Fi protocol.

The processor 870 may generate a mutated packet in terms of a Wi-Fi station.

FIG. 7 illustrates an example of a communication-connection state of the vehicular electronic device 10 when the vehicular electronic device 10 operates as a Wi-Fi access point.

When the vehicular electronic device 10 operates as a Wi-Fi access point, the vehicular electronic device 10 may be classified into a probe request listening state 911, an association listening state 912, and a connected state 913 and may perform communication-connection.

The processor 870 may retrieve the vehicular electronic device 10 that operates as a Wi-Fi access point. For example, the processor 870 may receive a beacon signal transmitted from the vehicular electronic device 10 and may retrieve the vehicular electronic device 10.

The processor 870 may select the vehicular electronic device 10 among a plurality of Wi-Fi access points. For example, the processor 870 may select the vehicular electronic device 10 based on a basic service set identification (BSSID) included in a beacon signal.

The processor 870 may arbitrarily change a state to the probe request listening state 911, the association listening state 912, and the connected state 913.

For example, the processor 870 may change the probe request listening state 911 to the association listening state 912.

For example, the processor 870 may change the association listening state 912 to the connected state 913 or the probe request listening state 911.

For example, the processor 870 may change the connected state 913 to the probe request listening state 911 or the association listening state 912.

The processor 870 may generate a mutated packet in any one state of the probe request listening state 911, the association listening state 912, and the connected state 913 and may transmit the generated mutated packet to the vehicular electronic device 10. The processor 870 may mutate any one of a probe packet, an authentication packet, and an association packet to generate a mutated packet and may transmit the mutated packet.

When a generated reception packet is not received or a generated abnormal reception packet is received in any one state of the probe request listening state 911, the association listening state 912, and the connected state 913 of the vehicular electronic device 10, the processor 870 may determine that the vehicular electronic device 10 is vulnerable to hacking.

When a reception packet corresponding to a mutated packet is not received or an abnormal reception packet is received in any one state of an initial state, a probe response/beacon listening state, an authentication listening state, an association response listening state, and a connected state of the vehicular electronic device hacking test apparatus 800, the processor 870 may determine that the vehicular electronic device 10 is vulnerable to hacking.

As exemplified in FIG. 8, the processor 870 may transmit an original authentication packet to convert the vehicular electronic device 10 into the association listening state 912.

The vehicular electronic device 10 may generate and transmit an association packet corresponding to an original authentication packet in the association listening state 912.

The processor 870 may generate and transmit a mutated association request packet.

When a response signal corresponding to a mutated association request packet is not received, the processor 870 may determine that the vehicular electronic device 10 is vulnerable to hacking.

Figure 9:
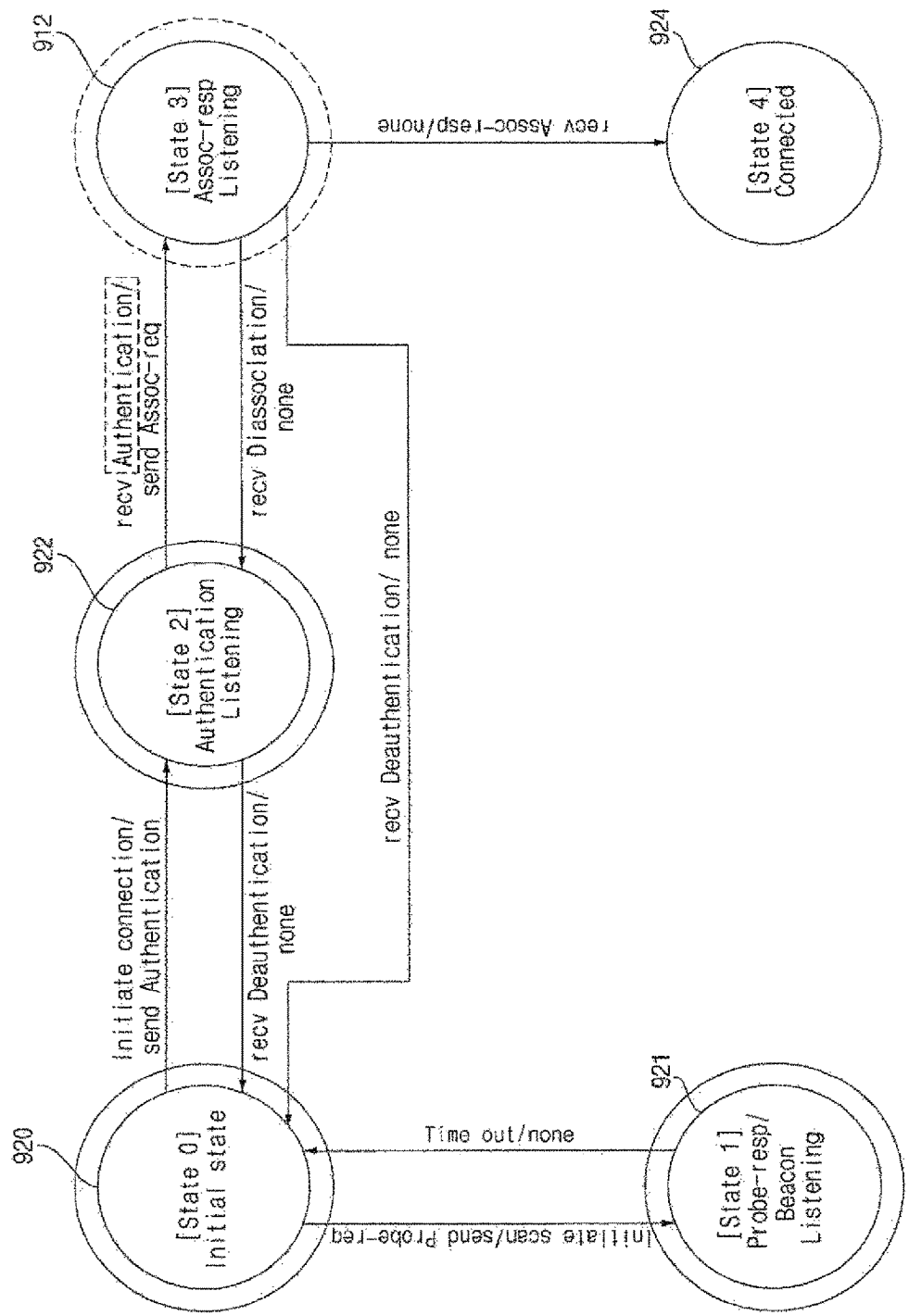
FIG. 9 is a diagram for explanation of a vehicular electronic device hacking test apparatus based on a Wi-Fi protocol according to an embodiment of the present invention.

FIG. 9 is a diagram for explanation of a vehicular electronic device hacking test apparatus based on a Wi-Fi protocol according to an embodiment of the present invention.

FIG. 9 is a diagram for explanation of an operation of the vehicular electronic device hacking test apparatus 800 when the vehicular electronic device 10 operates as a client (or a station).

In FIG. 9, the vehicular electronic device hacking test apparatus 800 may operate as a Wi-Fi access point.

The processor 870 may classify a communication-connection procedure into a plurality of states based on a Wi-Fi protocol.

The processor 870 may generate a mutated packet in terms of a Wi-Fi access point.

FIG. 9 is a diagram showing an example of a communication-connection state of the vehicular electronic device 10 when the vehicular electronic device 10 operates as a client (or a station).

When the vehicular electronic device 10 operates as a Wi-Fi client (or a station), the vehicular electronic device 10 may be classified into an initial state 920, a probe-resp/beacon listening state 921, an authentication listening state 922, an association response listening state 923, and a connected state 924 and may perform communication-connection.

The processor 870 may generate and transmit a beacon signal. The processor 870 may receive a response signal corresponding to the beacon signal, and then may generate a mutated packet.

The processor 870 may receive any one of a probe packet, an authentication packet, and an association packet from the vehicular electronic device 10 that operates as a Wi-Fi client (or a station).

The processor 870 may generate and transmit a mutated response packet in response to the received packet. The processor 870 may mutate any one of a probe response packet, an authentication response packet, and an association response packet to generate a mutated packet and may transmit the mutated packet.

When a generated reception packet is not received or a generated abnormal reception packet is received in any one state of the initial state 920, the probe-resp/beacon listening state 921, the authentication listening state 922, the association response listening state 923, and the connected state 924 of the vehicular electronic device 10, the processor 870 may determine that the vehicular electronic device 10 is vulnerable to hacking.

When a reception packet corresponding to a mutated packet is not received or an abnormal reception packet is received in any one state of a probe request listening state, an association listening state, and a connected state of the vehicular electronic device hacking test apparatus 800, the processor 870 may determine that the vehicular electronic device 10 is vulnerable to hacking.

As shown in FIG. 9, the processor 870 may transmit the original packet up to the initial state 920, the probe-resp/beacon listening state 921, and the authentication listening state 922 of the vehicular electronic device 10.

The vehicular electronic device 10 may enter the association response listening state 923, and then the processor 870 may transmit a mutated association response packet.

The processor 870 may monitor whether a disassociation packet is received. When the disassociation packet is not received, the processor 870 may determine that the vehicular electronic device 10 is vulnerable to hacking.

Figure 10:
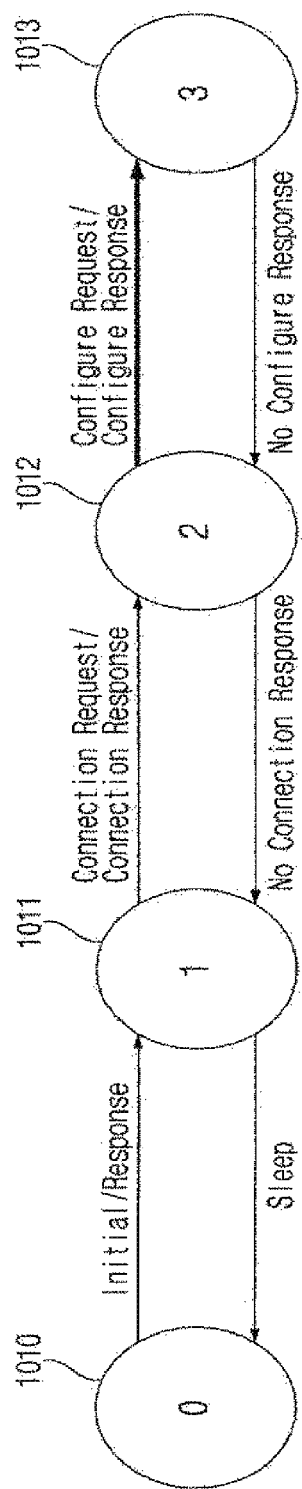
FIGS. 10 and 11 are diagrams for explanation of a vehicular electronic device hacking test apparatus based on a Bluetooth protocol according to an embodiment of the present invention.
Figure 11:
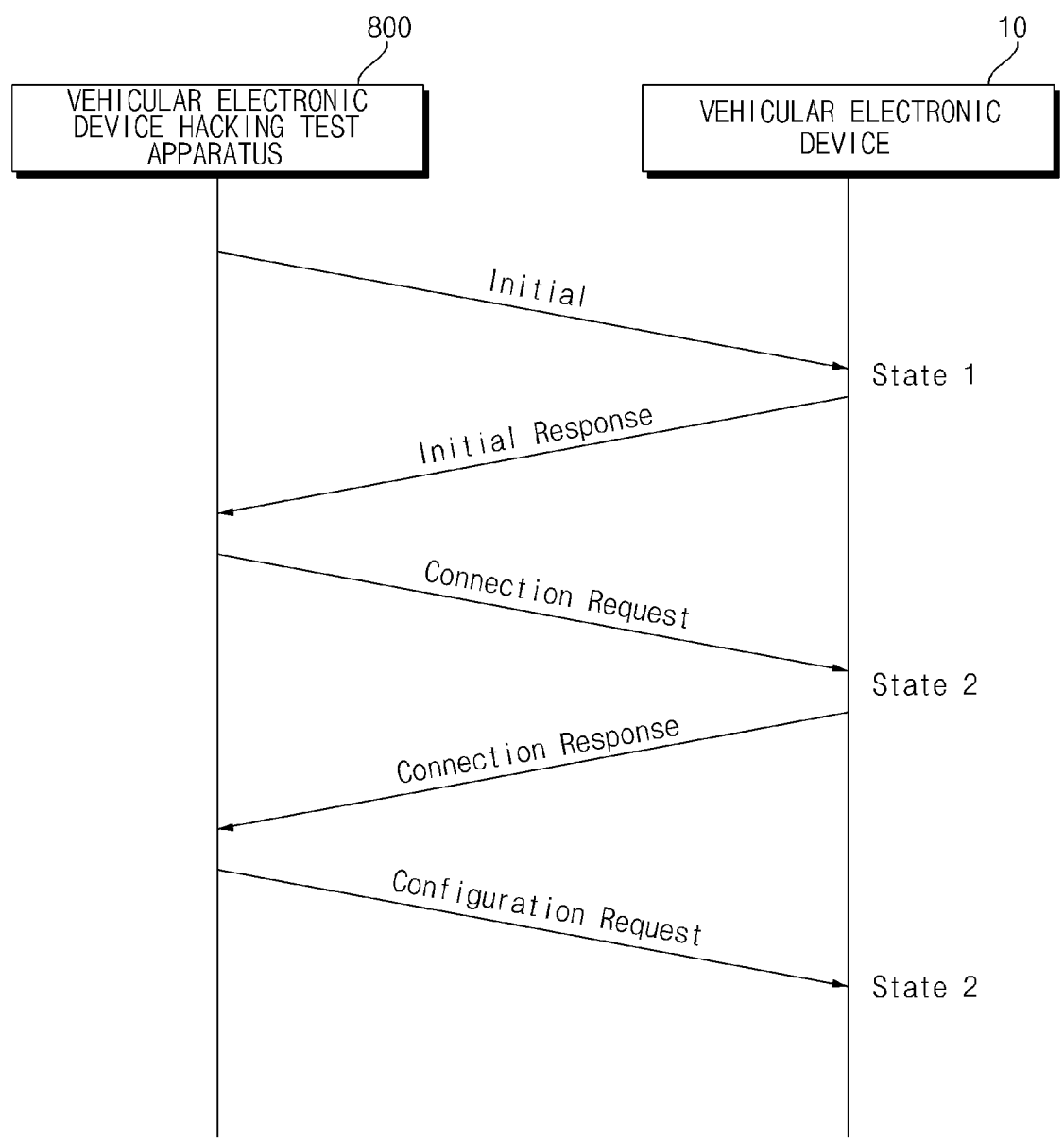

FIGS. 10 and 11 are diagrams for explanation of a vehicular electronic device hacking test apparatus based on a Bluetooth protocol according to an embodiment of the present invention.

Referring to the drawings, the processor 870 may classify a communication-connection procedure into a plurality of states based on a Bluetooth protocol.

The Bluetooth protocol may include L2CAP, SDP, RFCOMN, and OBEX.

The processor 870 may classify a communication-connection procedure into a plurality of states based on at least one of L2CAP, SDP, RFCOMN, or OBEX.

FIGS. 10 and 11 are diagrams showing an example of the vehicular electronic device hacking test apparatus 800 based on L2CAP of a Bluetooth protocol.

The vehicular electronic device 10 may classify communication-connection into four states and may perform communication-connection.

In each state, the vehicular electronic device hacking test apparatus 800 and the vehicular electronic device 10 may transmit and receive a packet.

As shown in FIG. 11, until the vehicular electronic device 10 is changed to a $0^{th}$ state 1010, a first state 1011, and a second state 1012, the processor 870 may transmit the original packet to the vehicular electronic device 10.

In a state in which the vehicular electronic device 10 is converted into the second state 1012, the processor 870 may mutate a configuration request packet and may transmit a mutated packet.

Then, when a configuration response packet is not received within a preset time, the processor 870 may determine that the vehicular electronic device 10 is vulnerable to hacking.

The aforementioned present invention can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disk drive (SDD), read-only memory (ROM), random-access memory (RAM), CD-ROM, magnetic tapes, floppy disks, optical data storage devices, carrier waves (e.g., transmission via the Internet), etc. In addition, the computer may include a processor and a controller. Accordingly, it is intended that the present invention cover the modifications and variations of this invention provided they come within the scope of the appended claims and their equivalents.

What is claimed is:

1. A vehicular electronic device hacking test apparatus comprising:
    a transmitter;
    a receiver; and
    a processor configured to classify a communication-connection procedure into one state of a plurality of states based on a preset communication protocol, to generate a mutated packet appropriate for one of the plurality of states by mutating at least a portion of an original packet configured to be transmitted in the plurality of states, to transmit the mutated packet to a vehicular electronic device through the transmitter, and to determine whether the vehicular electronic device is vulnerable to hacking based on whether a reception packet corresponding to the mutated packet is received through the receiver.

2. The vehicular electronic device hacking test apparatus of claim 1, wherein the processor classifies the communication-connection procedure into a first state, a second state, or a third state based on the preset communication protocol.

3. The vehicular electronic device hacking test apparatus of claim 2, wherein the processor generates and transmits a first mutated packet appropriate for the first state, and generates a second mutated packet appropriate for the second state upon receiving a first reception packet corresponding to the first mutated packet.

4. The vehicular electronic device hacking test apparatus of claim 3, wherein, when the first reception packet is not received, the processor determines that the vehicular electronic device is vulnerable to hacking.

5. The vehicular electronic device hacking test apparatus of claim 4, wherein, when the first reception packet is not received, the processor repeatedly generates and transmits the first mutated packet.

6. The vehicular electronic device hacking test apparatus of claim 5, wherein, when a number of times the first mutated packet is repeatedly generated in a state in which the first reception packet is not received is equal to or greater than a preset number of times, the processor determines that the vehicular electronic device is vulnerable to hacking.

7. The vehicular electronic device hacking test apparatus of claim 3, wherein the processor transmits the second mutated packet, and generates and transmits a third mutated packet appropriate for the third state upon receiving a second reception packet corresponding to the second mutated packet.

8. The vehicular electronic device hacking test apparatus of claim 3, wherein the processor transmits the second mutated packet, and generates and transmits the first mutated packet appropriate for the first state upon receiving a second reception packet corresponding to the second mutated packet.

9. The vehicular electronic device hacking test apparatus of claim 1, wherein the preset communication protocol comprises a Wi-Fi protocol.

10. The vehicular electronic device hacking test apparatus of claim 9, wherein the processor generates the mutated packet based on the original packet being configured to be transmitted by a Wi-Fi station.

11. The vehicular electronic device hacking test apparatus of claim 9, wherein the processor generates the mutated packet based on the original packet being configured to be transmitted by a Wi-Fi access point that is configured to communicate with one or more Wi-Fi stations.

12. The vehicular electronic device hacking test apparatus of claim 11, wherein the processor generates and transmits a beacon signal, and receives a response signal corresponding to the beacon signal, and then generates the mutated packet.

13. The vehicular electronic device hacking test apparatus of claim 1, wherein the preset communication protocol comprises a Bluetooth protocol.

14. The vehicular electronic device hacking test apparatus of claim 13, wherein the processor classifies the communication-connection procedure into one of the plurality of states based on at least one of L2CAP, SDP, RFCOMM, or OBEX.

15. The vehicular electronic device hacking test apparatus of claim 1, wherein the processor mutates a region except for a header among original packets appropriate for the plurality of states to generate the mutated packet.

16. The vehicular electronic device hacking test apparatus of claim 15, wherein the processor mutates an arbitrary portion of an information payload of the original packet to generate the mutated packet.

17. The vehicular electronic device hacking test apparatus of claim 1, wherein the processor is configured to generate the mutated packet to include a larger amount of data than the original packet.

* * * * *